(Model.)
O. C. DEVEREUX.
BUTTON.
No. 244,560. Patented July 19, 1881.
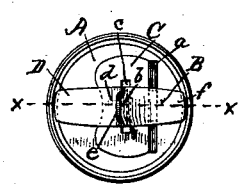
Fig. 1.
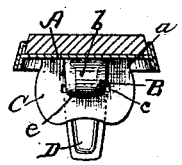 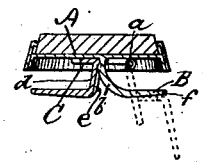 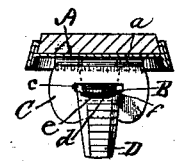
Fig. 3.  Fig. 2.  Fig. 4.
Witnesses.  Inventor.
H. W. Hibbard.  Oren C. Devereux
Wm. M. Joyce.

UNITED STATES PATENT OFFICE.

OREN C. DEVEREUX, OF PROVIDENCE, RHODE ISLAND.

BUTTON.

SPECIFICATION forming part of Letters Patent No. 244,560, dated July 19, 1881.

Application filed April 9, 1881. (Model.)

*To all whom it may concern:*

Be it known that I, OREN C. DEVEREUX, of Providence, in the State of Rhode Island, have invented an Improvement in Buttons, of which the following is a specification.

My invention relates to an improvement on the invention shown in Letters Patent No. 25,928, dated October 25, 1859, where the button is held by two outwardly-turned hooks forming the shoe, one of the said hooks being attached to the back of the head of the button, and the other attached to a plate hinged to the back of the head, so that the shank of the movable hook may be carried along the outer face of the stationary hook for the purpose of insertion or removal from the button-hole; and it consists in providing the widened shank of the movable hook with a depression or recess, serving, when thrown back, to receive the narrower outer end of the stationary hook. By thus protecting the sides and end of the stationary hook the detachment and replacement of the button may be effected with rapidity, without liability of catching the end of the stationary hook at the edges of the button-hole.

Figure 1 represents a plan view of the back of the button. Fig. 2 represents a section taken in the line $x\, x$ of Fig. 1. Fig. 3 represents a central section taken transversely between the shanks of the hooks, and showing the hinged plate and movable hook in elevation, as at the extreme backward position, and showing the face of the shank of the stationary hook. Fig. 4 represents a similar section, showing the outer end of the stationary hook and the hinged plate with movable hook in elevation.

In the drawings, A is the back plate of the head of the button, to which the hook B, made with a wide shank, and narrower at its outer end, is firmly attached.

C is a plate made of smaller dimensions than the plate A, and hinged to the plate A at the point $a$, and also provided with a hook, D, attached to the plate C at the outer edge of the slot or opening $c$ made to receive the stationary hook B.

The shanks $b$ and $d$ of the hooks B and D are made wide enough to prevent the button from turning around when locked in the button-hole; and the shank $d$ of the movable hook is grooved or hollowed out on its face so as to form a recess, $e$, which serves to receive the narrower outer end, $f$, of the stationary hook B and prevent its catching at the edge of the button-hole when the plate C and hook D are thrown back, as shown by dotted lines in Fig. 2, in process of insertion. The button is thus made capable of being operated for insertion or removal with great rapidity and certainty.

The wide shank $b$ of the stationary hook B is formed with thin edges, and has its rounded or beveled side turned toward the shank $d$ of the hook D. Thus when the button is being locked only the central portion of the shank of the hook B will be subjected to the rubbing friction of the edge of the slot $c$ in the plate C, which carries the movable hook D. By this means the friction of the locking parts is reduced, and the shank of the stationary hook B is not liable to become disfigured by the uneven wear of the plating, as with a rubbing-surface made as wide as the shank, and the button can be made to close with a better snap.

I am aware that buttons have been made with L-shaped pieces pivoted together at their bases or shanks, so that when the movable piece is thrown back the ends of the said pieces will be protected one by the other, as the case may be. I do not, however, claim protecting or covering the outer end of one L-piece or hook by a slot, depression, or recess made in the outer end of the other; but

I claim as my invention—

In a button, the combination of the hook B and plate A with the hook D and plate C, jointed to the side of the plate A, so that the plates A and C may be turned at about right angles to each other, bringing the corresponding sides of the hooks also at about right angles with each other and the outer end of the hook B into the groove or recess $e$ in the shank of the hook D, so that the sides of the recess $e$ will embrace the edges of the end of the hook B, substantially as and for the purpose set forth.

OREN C. DEVEREUX

Witnesses:
HARMON S. BABCOCK,
H. W. HUBBARD.